S. LOWE.
TOOL HOLDER.
APPLICATION FILED JAN. 9, 1909.

938,600. Patented Nov. 2, 1909.

Witnesses:
H. A. Lamb.
F. C. Smith

Inventor
Solomon Lowe,
By his Attorney Geo. D. Phillips

UNITED STATES PATENT OFFICE.

SOLOMON LOWE, OF BRIDGEPORT, CONNECTICUT.

TOOL-HOLDER.

938,600.
Specification of Letters Patent.
Patented Nov. 2, 1909.

Application filed January 9, 1909. Serial No. 471,484.

*To all whom it may concern:*

Be it known that I, SOLOMON LOWE, a citizen of the United States, and a resident of Bridgeport, in the county of Fairfield and State of Connecticut, have invented certain new and useful Improved Tool-Holders, of which the following is a specification.

My invention relates to auxiliary boring tool holders, and it consists in certain details of construction to be more fully set forth in the following specification.

The object of my invention is to provide a simple device that can be temporarily attached to a lathe turning tool for the purpose of boring, centering, etc.

Figure 1:
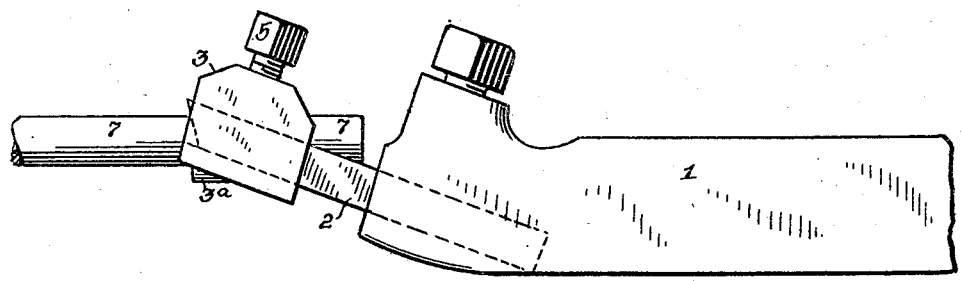
Figure 2:
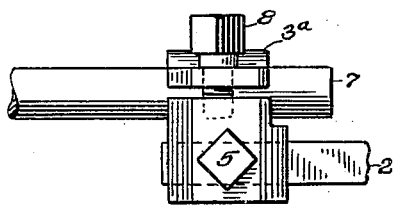
Figure 3:
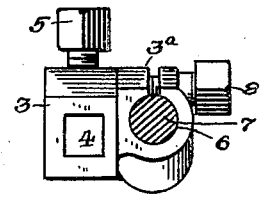
Figure 4:
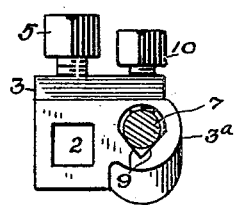

To enable others to understand my invention, reference is had to the accompanying drawings, in which:

Figure 1 represents the ordinary tool holder having a removable turning tool with my improved boring tool holder mounted thereon; Fig. 2 indicates an upper plan view of the boring tool holder and broken view of the turning and boring tools; Fig. 3 indicates a detail rear elevation of the boring tool holder, and sectional view of the shank of the boring tool; Fig. 4 indicates a detail rear elevation of the boring tool holder showing a slight modification in its construction; and Fig. 5 is a detail side elevation of another modified construction of the boring tool holder.

1 represents the ordinary lathe tool holder having the turning tool 2 inserted therein, which tool usually stands at an angle of about 20°. The boring tool holder 3 is provided with the square hole 4 adapted to embrace the turning tool 2 and be secured thereto by the binding screw 5. Integral with the part 3 is the clamp 3ª having the hole 6 adapted to receive the shank portion of the boring tool 7 which is secured therein by means of the clamping screw 8.

The modified feature shown at Fig. 4 consists in forming the angular seat 9 for the shank of the boring tool, so as to accommodate different sizes. In this construction, the binding screw 10 will be placed at the top and bear directly on the shank.

Figure 5:
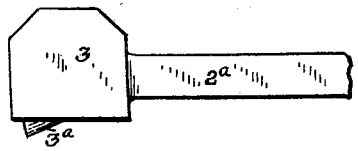

In the modified construction shown at Fig. 5, the shank 2ª forms an integral part of the holder 3 and is adapted to be inserted in tool opening of the holder 1 when the turning tool 2 is removed. In this construction the binding screw 5 would not be required. In place of making the shank 2ª integral with the holder 3, it could be a separate piece inserted in said holder, in which case the binding screw would be used.

The openings 4 and 6 of the holder 3 are arranged at such an angle with respect to each other that when the holder is mounted on the turning tool 2 the boring tool 7 will always remain in a horizontal position, and said holder can be raised and lowered without disturbing this horizontal position.

The peculiar advantage of the holder above described is that it requires no base to be inserted in the tool post of a lathe, but can readily be applied directly to that class of turning tools inserted in a holder, which holder is inserted in the tool post of a lathe, and all that is necessary in using the boring tool after it is in place is to turn the toolpost in the proper direction for boring.

Having thus described my invention, what I claim as new and desire to secure by Letters Patent is:

The combination with a lathe tool and its holder of a boring tool holder adapted to be adjustably mounted on the lathe tool, for the purpose set forth.

Signed at Bridgeport in the county of Fairfield and State of Connecticut this 8 day of Jan. A. D. 1909.

SOLOMON LOWE.

Witnesses:
JOHN B. CLAPP,
GEO. D. PHILLIPS.